US007023199B2

(12) United States Patent
Blubaugh et al.

(10) Patent No.: US 7,023,199 B2
(45) Date of Patent: Apr. 4, 2006

(54) POSITION SENSING CYLINDER CAP FOR EASE OF SERVICE AND ASSEMBLY

(75) Inventors: James F. Blubaugh, Peoria, IL (US); Arun M. Hamasagar, Plainfield, IL (US); David J. McIntyre, Plainfield, IL (US); Thomas G. Skinner, Bolingbrook, IL (US); Sean P. Wiltz, Oak Forest, IL (US)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 10/655,917

(22) Filed: Sep. 5, 2003

(65) Prior Publication Data

US 2005/0189937 A1 Sep. 1, 2005

Related U.S. Application Data

(63) Continuation of application No. 60/437,521, filed on Dec. 31, 2002.

(51) Int. Cl.
*G01B 7/14* (2006.01)

(52) U.S. Cl. .......................... 324/207.13; 324/207.24; 324/261

(58) Field of Classification Search ........... 324/207.13, 324/207.24, 260, 261, 220; 92/128; 73/632, 73/779, 431, 866.5, 314
See application file for complete search history.

(56) References Cited

U.S. PATENT DOCUMENTS

| | | | |
|---|---|---|---|
| 3,160,836 A | 12/1964 | Farley | |
| 3,898,555 A | 8/1975 | Tellerman | |
| 3,915,070 A | 10/1975 | Mailliet | |
| 4,121,504 A | 10/1978 | Nowak | |
| 4,179,982 A | 12/1979 | Saotome | |
| 4,552,055 A | 11/1985 | Foxwell | |
| 4,632,018 A | 12/1986 | Lymburner | |
| 4,718,647 A | 1/1988 | Ludwig | |
| 4,771,866 A | 9/1988 | Heideman et al. | |
| 4,788,489 A | 11/1988 | Kobayashi et al. | |
| 4,855,675 A * | 8/1989 | Russell et al. | 324/207.19 |
| 4,883,150 A | 11/1989 | Arai | |
| 4,899,643 A | 2/1990 | Hvilsted et al. | |
| 4,952,873 A | 8/1990 | Tellerman | |
| 4,961,055 A | 10/1990 | Habib et al. | |
| 5,103,172 A | 4/1992 | Stoll | |
| 5,150,049 A | 9/1992 | Schuetz | |

(Continued)

FOREIGN PATENT DOCUMENTS

DE 2313215 6/1974

(Continued)

OTHER PUBLICATIONS

Balluff, Micropulse—Liner Position Transducers 2002 Catalog, pages through 103.

(Continued)

*Primary Examiner*—Jay Patidar

(57) ABSTRACT

An actuator arrangement includes a body and at least one of a piston assembly and a rod assembly slideably disposed in the body. A sensor arrangement includes a sensor, a sensor electronics module, and an interactive element. The interactive element is moveable relative to the sensor, wherein a position of the interactive element indicative of a position of the at least one of a piston assembly and a rod assembly is communicated to the sensor electronics module through the sensor. A housing assembly is attached to an end of the body and includes a sensor pilot portion. The sensor pilot portion in the housing assembly is structured and arranged to sealably receive the sensor electronics module therein, wherein the sensor electronics module is encased within the housing.

23 Claims, 6 Drawing Sheets

U.S. PATENT DOCUMENTS

| | | | | |
|---|---|---|---|---|
| 5,182,980 | A | 2/1993 | Greer | |
| 5,198,761 | A | 3/1993 | Hashimoto et al. | |
| 5,210,490 | A * | 5/1993 | Munch et al. | 324/207.17 |
| 5,320,325 | A | 6/1994 | Young et al. | |
| 5,514,961 | A | 5/1996 | Stoll et al. | |
| 5,583,433 | A | 12/1996 | Sawa | |
| 5,717,330 | A | 2/1998 | Moreau et al. | |
| 5,815,091 | A | 9/1998 | Dames et al. | |
| 5,952,823 | A | 9/1999 | Nyce et al. | |
| 5,977,778 | A | 11/1999 | Chan et al. | |
| 5,998,992 | A | 12/1999 | Arai | |
| 6,250,612 | B1 | 6/2001 | Doll | |
| 6,356,071 | B1 | 3/2002 | Koski et al. | |
| 6,509,733 | B1 | 1/2003 | Blubaugh et al. | |
| 6,528,990 | B1 | 3/2003 | Nyce | |
| 2002/0074994 | A1 | 6/2002 | Blubaugh et al. | |
| 2002/0135359 | A1 | 9/2002 | Steinich | |

FOREIGN PATENT DOCUMENTS

| | | | |
|---|---|---|---|
| DE | 91 09 026.1 | | 10/1991 |
| DE | 100 44 984 | A1 | 3/2002 |
| EP | 1081390 | A2 | 3/2001 |
| GB | 2 021 770 | | 12/1979 |

OTHER PUBLICATIONS

MTS Sensors Group, The Magnetostriktive Position Sensors, Temposonics M-Series Rod Model MH.

MTS Temposonics, Linear Position Sensors, Product Specifications.

MTS Temposonics, Absolute Non-Contacting Position Sensors, Application Guide, 1998.

Hydro-Line, Inc., HLT-II, The Newest Generation Hydr-Line Magnetostrictive Linear Positioning Sensing Transducer, 1996.

MTS Temposonics LK Embeddable Sensors, OEM Integrator's Manual, 1998.

MTS Temposonics L Series LD, Product Specifications, 1999.

MTS Temposonics III and L Series Position Sensors, Product Line Overview, 1996.

MTS Temposonics L Series LD, Product Specifications, 1998.

Attachment 1, MTs Performance Capabilities, 1998.

Attachment 2, Photo of Sensor, no date.

Attachment 3, Photo of Temposonics Sensor in a Cylinder, no date.

Attachment 4, Photo of Sensor Connector, no date.

Patent Abstracts of Japan, Publication No. 63067411, Publication Date Mar. 26, 1988, Kubota Ltd.

Patent Abstracts of Japan, Publication No. 5018406, Publication Date Jan. 26, 1993, Yamaha Motor Co. Ltd.

Patent Abstracts of Japan, Publication No. 58225205, Publication Date Dec. 27, 1983, Makome Kenkyusho:KK.

* cited by examiner

POSITION SENSING CYLINDER CAP FOR EASE OF SERVICE AND ASSEMBLY

This application claims the benefit of U.S. Provisional Application No. 60/437,521, filed Dec. 31, 2002, which is hereby incorporated by reference in its entirety.

TECHNICAL FIELD

This invention relates generally to a fluid cylinder, such as a hydraulic or a pneumatic cylinder or the like, and more particularly to a fluid cylinder including an embedded sensor and sensor electronics module for determining positional information for a rod of the cylinder.

BACKGROUND ART

Known linkage systems utilizing fluid cylinders for changing link length and angular orientation typically utilize controls wherein information relating to the length and/or velocity of movement of one or more cylinder rods is required. The electrical aspects of control apparatus for such systems typically require the use of a variety of sensors, including, but not limited to, lever position sensors and linkage position sensors, and also utilize electro-hydraulic valves and an onboard electronic control module operable for executing a control strategy for linkage movement. A central portion of such control strategies is typically a linkage position input which can be embodied, for instance, in positional and/or velocity information for a cylinder rod. Such positional and velocity information is typically collected by a position sensor mounted on or in a subject fluid cylinder or on a linkage, and through the linkage kinematics one can translate linkage angle into cylinder length. Reliable data collection from such sensors has been found to be largely dependent on the ability to maintain the integrity of such sensors and the conductive element or other path of communication between the sensor and the system under adverse operating and environmental conditions, such as heat, cold, dust, dirt, and contact with rocks and other objects that can damage the sensor and/or its path of communication with other elements of the control system.

Currently, to reduce the potential for damage to sensors from such operating and environmental factors, the sensors themselves are sometimes located within the cylinder housing or body. Reference in this regard, Chan et al. U.S. Pat. No. 5,977,778 issued Nov. 2, 1999 and assigned to Case Corporation of Racine, Wis., which discloses a method and apparatus for sensing piston position including a transmitter/receiver unit mounted on a cylinder housing in communication with an internal cavity thereof for sensing the position of a piston of the cylinder and communicating via a conductive path to circuitry located externally to the cylinder for processing the signal data and generating an output signal representative of the piston position. Reference also Tellerman U.S. Pat. No. 4,952,873 issued Aug. 28, 1990 and assigned to MTS Systems Corporation of Eden Prairie, Minn., which discloses a compact head, signal enhancing magnetostrictive transducer mounted on a mounting head positionable in a tank, cylinder or the like for sensing a piston position or liquid level, which transducer is connected via one or more conductive paths to electronic circuitry for providing output signals indicative of a displacement. However, known systems such as these have been found to provide only a partial solution to the problems encountered as electronic components required for the operation of the sensors and transducers thereof remain externally located, and as a result sensor inaccuracies and even worse sensor failure is likely due to the cylinder and sensor being subjected to adverse operating and environmental factors.

Moreover, it is typically required that the cylinder be physically robust and possess the ability to repeatably transfer a significant load between the ends of the cylinder. Such usage is common to implement bearing earthmoving machines, compactors and rams to name just a few. To ensure that the loads are suitably transferred by the cylinder in physically demanding environments which are associated with such cylinder usage, the cylinders are often unitary and may have limited bolted or removable joints.

Accordingly, it is customary to use a cylinder body which includes a pair of end caps and is adapted to receive a rod therein. At least one of the end caps is typically bolted to the tube or cylinder body to provide proper transfer of force between the cylinder ends, in a trunnion mount cylinder design. Another type of cylinder is a clevis mount cylinder which includes a body and a piston and rod assembly therein. However, the end caps are generally welded to the body making the cylinder a unitary element and one which is often not readily serviceable without removing the cylinder from the machine or linkage to which it is attached.

In view that many cylinder applications require robust usage which include suitable operation even if the cylinder is prone to impact and abrasion from rock, earth, slag, debris, etc. during use, in combination with the requirement that the cylinders include the ability to transfer significant force loads therethrough, it may be unacceptable to position the sensor or sensor electronics outside of the cylinder body even if an impact shield is positioned thereover. Further, cylinders such as trunnion mount designs may better facilitate service to a sensor mounted within the cylinder.

Moreover, if it is attempted to at least partially conceal the sensor and/or sensor electronics within a sturdy outer structure, then it is often difficult to easily access the position sensor or sensor electronics when service is required. Unfortunately, if a position sensor needs to be serviced or replaced, it is often necessary to replace the entire cylinder unit at a significant expense to the machine owner or operator.

Accordingly, the present invention is directed to overcoming one or more of the problems as set forth above.

SUMMARY OF THE INVENTION

In one aspect of the present invention, an actuator arrangement is provided and includes a body, a piston assembly slideably disposed in the body, and a sensor arrangement including a sensor, a sensor electronics module, and an interactive element, the interactive element being moveable relative the sensor, wherein a position of the interactive element indicative of a position of the piston assembly is communicated to the sensor electronics module through the sensor. A housing assembly is provided and is attached to an end of the body and includes a sensor pilot portion. The sensor pilot portion in the housing assembly is structured and arranged to sealably receive the sensor electronics module therein, wherein the sensor electronics module is encased within the housing.

The present invention further provides a trunnion mounted cylinder arrangement including a body, a piston assembly slideably disposed in the body, and a sensor arrangement including: a sensor, a sensor electronics module, and an interactive element, the interactive element being moveable relative the sensor, wherein a position of the interactive element indicative of a position of the piston assembly is communicated to the sensor electronics module through the sensor. A housing assembly is also provided and is attached to an end of the body and includes a sensor pilot portion. The sensor pilot portion in the housing is structured and arranged to sealably receive the sensor electronics module therein, wherein the sensor electronics module is encased within the housing.

The present invention further provides a method of operating a fluid cylinder including a piston assembly slideably disposed in a body and a piston position sensor assembly adapted to be encased within and removably receivable within the fluid cylinder, the method comprising: moving the piston assembly along an axial reference within the body; sensing a piston position within a sensor portion of the piston position sensor assembly through communication between a sensor portion and an interactive element attached to the piston assembly; telescopically receiving the sensor portion within the piston assembly; transmitting the sensed piston position to an encased sensor electronics module which is piloted along the reference axis within a pilot portion of a housing assembly attached to the body; and providing substantially no leakage of working fluid between a piston chamber and an area external thereto through a sealed engagement between the housing assembly and the sensor assembly.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

Although the drawings represent embodiments of the present invention, the drawings are not necessarily to scale and certain features may be exaggerated in order to better illustrate and explain the present invention. The exemplifications set out herein illustrate several embodiments of the invention, and such exemplifications are not to be construed as limiting the scope of the invention in any manner.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Figure 1:
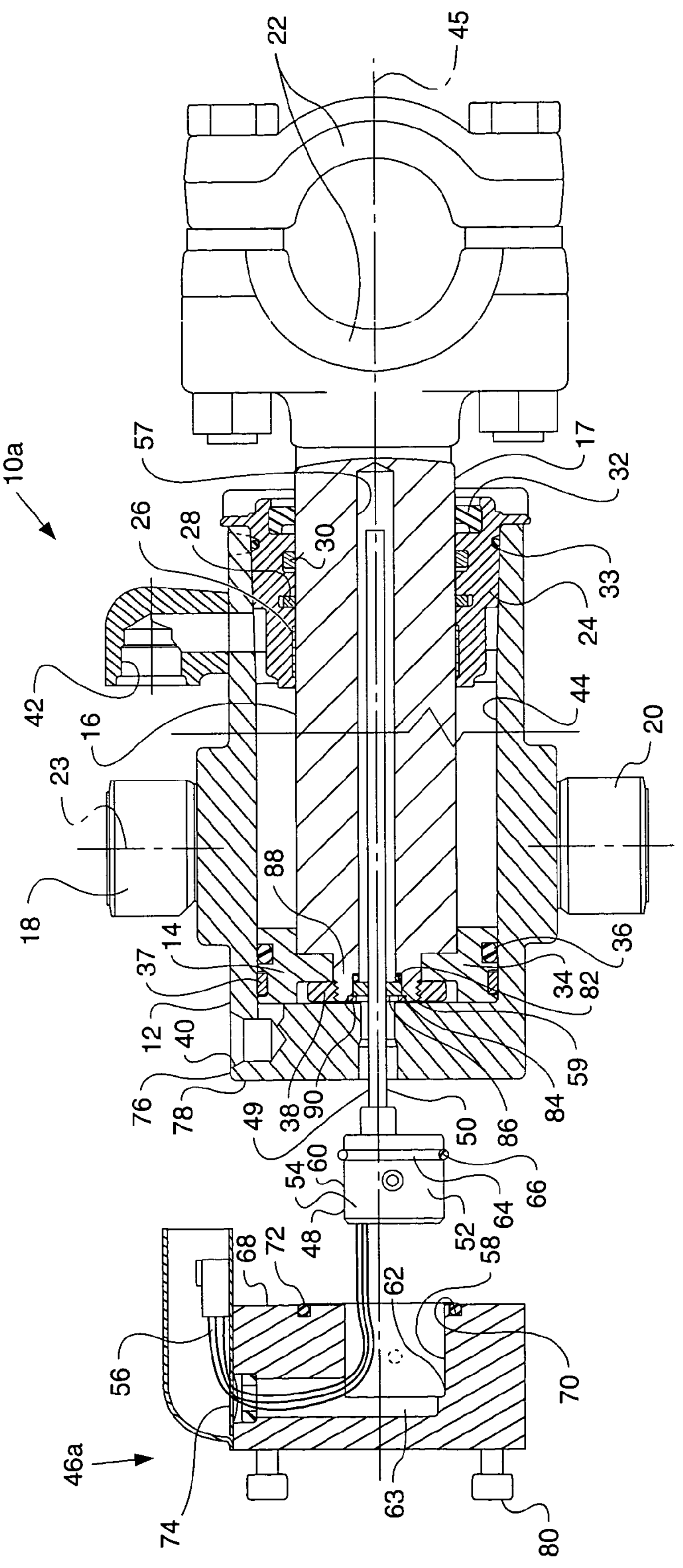
FIG. 1 is a sectional view of a first embodiment of a fluid actuator assembly according to the present invention, showing the housing and position sensor assembly in exploded view format.

Referring to FIG. 1, a first embodiment of a fluid actuator arrangement 10*a* according to the present invention is shown and includes a body 12 and a piston assembly 14 connected with a rod assembly 16. Although the actuator assembly 10*a* may be depicted as a trunnion mount actuator it is envisioned that the present invention is equally applicable to other types of actuators such as clevis mount actuators or any other actuator known to those having ordinary skill in the actuator arts. Rod assembly 16 includes a rod 17 which is slideably disposed within the body 12 of the actuator.

The actuator assembly 10*a* may include a pair of mounting bosses 18, 20, or a trunnion, projecting radially, outwardly from the body 12, and the rod 17 may be attached to an eye or rod mount 22. In operation, for example, the mounting bosses 18, 20 may be retained in a receiving mount (not shown), such as a pillow block or a yoke, such that the cylinder would be rotatable about a transverse reference axis 23. The rod mount 22 may be fastened about a rod or pin which is allowed to freely rotate within the rod mount 22.

The actuator assembly 10*a* may further include a sealed guide 24 which encloses an end of the body 12 and may include packing (or a wear ring) 26, a buffer seal 28, a back-up seal 30 (or a U-cup), a dust seal 32 (or wiper), and an O-ring 33, as is customary. At the other end of the actuator 10*a*, the piston assembly 14 includes a piston 34 having a piston seal 36 and a wear ring 37 therein. A nut 38 (or a bolt) ensures that the piston 34 is secured to the rod 17. It may be seen that upon introduction of a pressurized working fluid, such as hydraulic fluid, into a port 40, and thereafter into a piston chamber 44, the rod assembly 16 is urged to extend along an axial reference axis 45. In contrast, introduction of hydraulic fluid (or other pressurized fluid) into port 42, simultaneously with the discharge of fluid from the port 40, causes the rod assembly to retract and return to the shown position (FIG. 1).

The actuator assembly 10*a* further includes a housing assembly 46*a* and a position sensor arrangement or assembly 48 protectively sandwiched between the body 12 and the housing assembly 46*a*. The sensor assembly 48 includes an elongate sensor 49 including a pressure pipe 50 which is attached to a cylindrical sensor body 52 through a brazed attachment, for example. Within the sensor body 52 is a sensor electronics module 54, which may be centrally positioned and aligned within the sensor body 52. Since known magnetostrictive sensors typically include a large bulky sensor electronics module mounted outside of the cylinder body, such sensors were particularly prone to damage and premature wear due to external influences (such as rocks, earth, etc.) being thrust upon the module.

In contrast, in the exemplary embodiment, the sensor electronics module 54 is itself encased within the sensor body 52 and, in turn, the sensor body 52 is encased within the housing assembly 46*a*. Thus, the sensor assembly 48 is protected from environmental conditions including, but not limited to, moisture, dirt, dust, and contact with objects that can damage module 54 such as rocks and the like. Another advantage is that the conductive path connecting module 54 with the sensor 49 is relatively short and also effectively embedded and protected, such that external signal noise which can interfere with the torsional strain wave pulse is minimized, it being well known that such signals can be difficult to discriminate from external interference noise, even with advanced circuitry. External noise interference, however, is not generally a problem in relation to typical position signals outputted by the sensor electronics module.

The sensor assembly 48 may be disposed in a pilot opening 58 (a sensor pilot portion) of the housing assembly 46*a*. The sensor 48 may be a conventionally operable magnetostrictive type sensor typically used for determining the position of an object such as the piston or rod assemblies 14, 16 relative to another object or location (e.g., the cylinder body 12), and includes the pressure pipe 50 mounted thereto and extending axially into the piston chamber 44. Pressure pipe 50 is cooperatively telescopically received within an axial passage 57 extending into and through at least a portion of the piston assembly 14 or the rod assembly 16, such as the rod 17. The pressure pipe 50 may contain a conventionally constructed and operable magnetostrictive element or waveguide (not shown) that interacts with an interactive element 59 such as an annular magnet, for example, mounted within the piston assembly 14 or the rod assembly 16, such as the rod 17, as described hereinbelow.

Briefly, the waveguide may consist of a wire (not shown) which is connected to the sensor 48 and extends through the pressure pipe 50. Accordingly, the sensor assembly 48 is operable for generating current pulses which are sent through the wire. The interactive element 59 encircles the pressure pipe 50 and includes a magnetic field which interacts with the current pulse causing a torsional pulse in the waveguide which is transmitted as a torsional strain wave that has a time period and which is reflected back to the sensor 49. The torsional strain wave is sensed by a mode converter or other conventional sensor element in the sensor 49 which generates an output signal. This output signal is then communicated to the sensor electronics module 54 which compares the strain wave to the time of launch of the current pulse causing the torsional strain wave and determines the distance to the magnet 59 from the converter. The sensor electronics module 54 determines the time interval between the application of the current pulse and the reception of the torsional strain wave by the converter or other sensor element to indicate the position of the magnet (and, therefore, the piston assembly 14 and the rod assembly 16) and output a position signal representative thereof. The sensed position signal is transferred or communicated to a control center, such as an electronic control module (ECM), for example through the wires 56.

Since substantially all of the sensor electronics may be compactly housed within the sensor body 52, the sensor body, in turn, may be built into the pilot opening 58 of the housing assembly 46*a*. The sensor body 52 includes an outer surface 60 which engages a cylindrical wall 62 defining the pilot opening 58. It may be seen that a seal groove 64 is provided within the outer surface 60 of the sensor body 52. Accordingly, a seal assembly 66, such as an O-ring and back-up ring combination may be disposed within the groove 64 for an effective high pressure seal between the piston chamber 44 and a dead space 63 located immediately behind the sensor assembly 48.

The housing assembly 46*a* includes a face 68, and a groove 70 is provided therein to accommodate an O-ring 72. The body 12 of the actuator assembly 10 includes an end 76 having a face 78 thereon which sealingly abuts with the O-ring 72 within the housing assembly 46*a*. A plurality of fasteners 80 may removably connect the housing assembly 46*a* with the body 12. It may be seen that an access opening 74 is provided within the housing assembly 46*a* to allow the wires 56 to exit the housing assembly 46*a*.

The rod assembly 16 includes the ring shaped magnet 59 provided within a first bore 82 within an end 88 of the rod 17. An annular spacer 84 may be provided between the magnet 59 and a retaining ring 86 to protect the magnet from being damaged during assembly. Alternatively or additionally, the magnet 59 may be overmolded to protect the magnet from being damaged during assembly. The retaining ring 86 is engaged within a second bore 90 provided within the end 88 of the rod 17. Alternatively, it is envisioned that the end 88 of the rod 17 may include female threads which may accommodate the annular magnet captured between a male threaded fastener engaged within the female threads of the end 88 of the rod 17. Other means of capturing the magnet 59 within either the rod or the piston assembly which are known to those having ordinary skill in the art are contemplated by the present invention.

Figure 2:
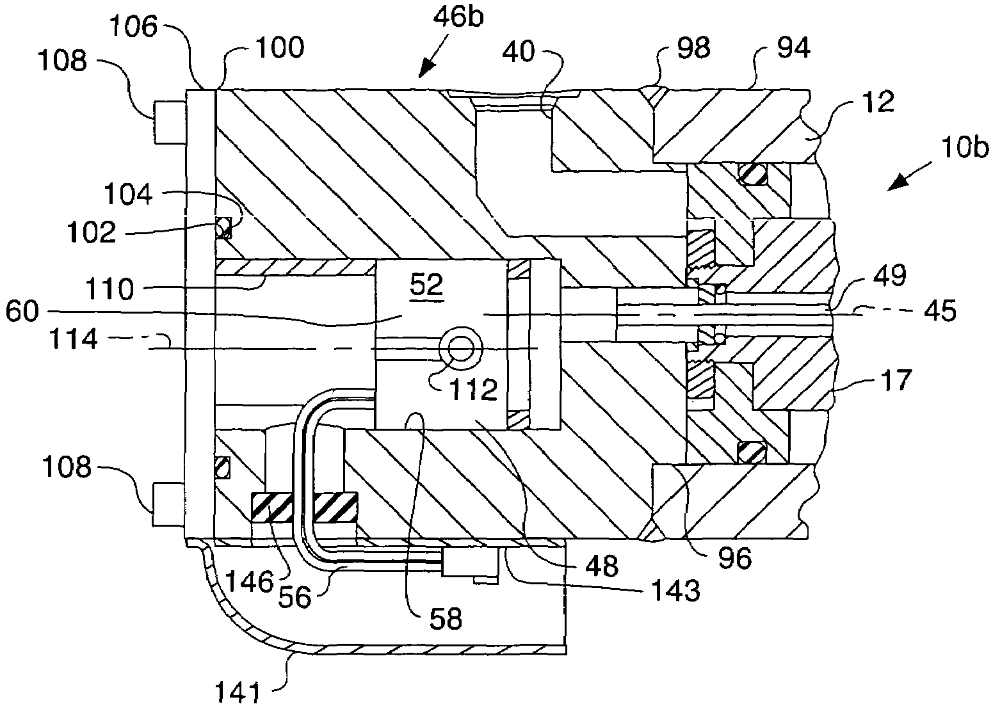
FIG. 2 is a fragmentary cross-sectional view of a second embodiment of a fluid actuator assembly.

Referring to FIG. 2, a second embodiment of a fluid actuator 10*b* is shown and includes a stepped portion 96 of the housing assembly 46*b* attached to an end 94 of the body 12. The body 12 and the housing assembly 46*b* may be integrally attached, for example by a welded joint 98 or other known sealed attachment means which may be customarily used. A second end 100 of the housing assembly 46*b* includes a groove 102 to accommodate an O-ring 104 disposed therein. The housing assembly 46*b* further includes a cover 106 in sealed abutment with the end 100 through the O-ring 104. A plurality of fasteners 108 is provided to attach the cover 106 to the end 100 of the housing 46*b*. A spacer 110 is provided within the pilot opening 58 to ensure that there is insignificant movement of the sensor body 52 in the axial direction. The spacer 110 may be, for example, a C-shaped spacer that is arranged to allow wires 56 to pass therethrough. Further, a set screw (not shown) may be threaded radially through the housing 46*b* and engaged with an indentation 112 provided within the surface 60 of the sensor body 52. It may be seen that a centerline reference axis 114 of the sensor body 52 may be offset relative to the axial reference 45 coinciding with the sensor 49 and may be in alignment with the center of the sensor body 52. Thus, as illustrated in FIG. 2, the sensor body 52 and/or the sensor electronics module 54 may be piloted along the axial reference 45 and may be piloted in an offset position with respect to the axial reference 45. This offset allows for additional space for the fluid port 40 and also serves to limit rotational movement of the sensor body 52 relative to the housing 46*b*, that is, if the set screw (not shown) is either not used or becomes loose.

Figure 3A:
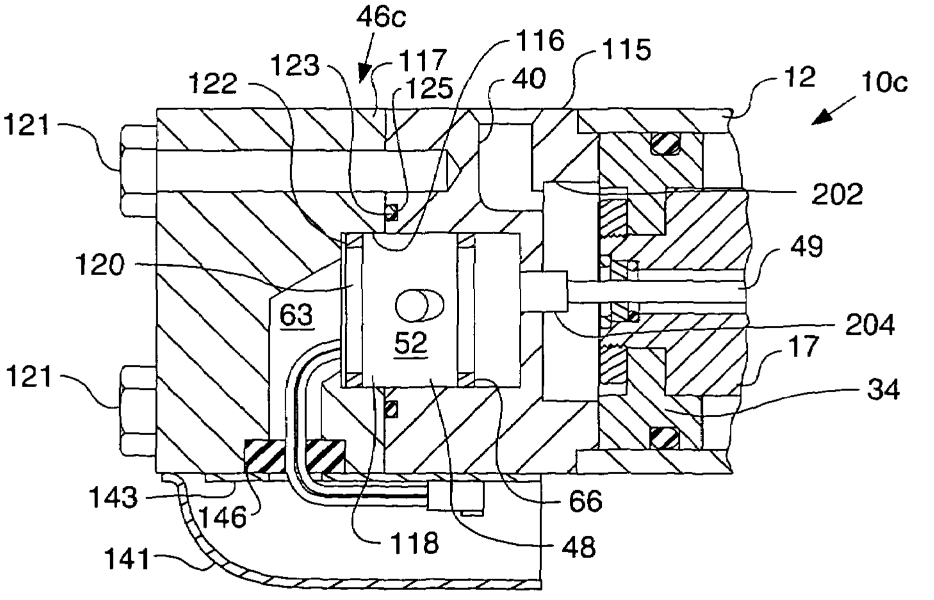
FIG. 3A is a fragmentary cross-sectional view of a third embodiment of a fluid actuator assembly.

Referring to FIG. 3A, a third embodiment of a fluid actuator 10*c* is shown and includes a two-part housing 46*c* including a first housing portion 115 and a second housing portion 117. The second portion 117 of the housing 46*c* includes a recessed opening 116 provided therein. It will be understood that when it is desired to service or remove the sensor assembly 48, the second portion 117 may be removed to expose an extended end portion 118 of the sensor body 52. In so doing, the sensor 48 may be easier to be removed. The actuator assembly 10*c* may also include a back-up seal 122, which may be provided in a groove 120 within the end 118 of the sensor body 52. If, for example, the seal assembly 66 were to fail then the back-up seal 122 would prevent fluid from entering the dead space 63 and ultimately leaking from the actuator assembly. The first and second housing portions 115, 117, which may be attached by one or more fasteners 121, such as threaded fasteners, may be sealed through an O-ring 123. The O-ring 123 may fit within an O-ring groove 125 that is provided within the first housing portion 115 (as shown in FIG. 3A) or the second housing portion 117. It should be appreciated that while the O-ring 123 and the O-ring groove 125 are shown in FIG. 3A as being disposed radially inward of the fasteners 121, the O-ring 123 and the O-ring groove 125 may, alternatively, be disposed radially outward of the fasteners 121.

Figure 5:
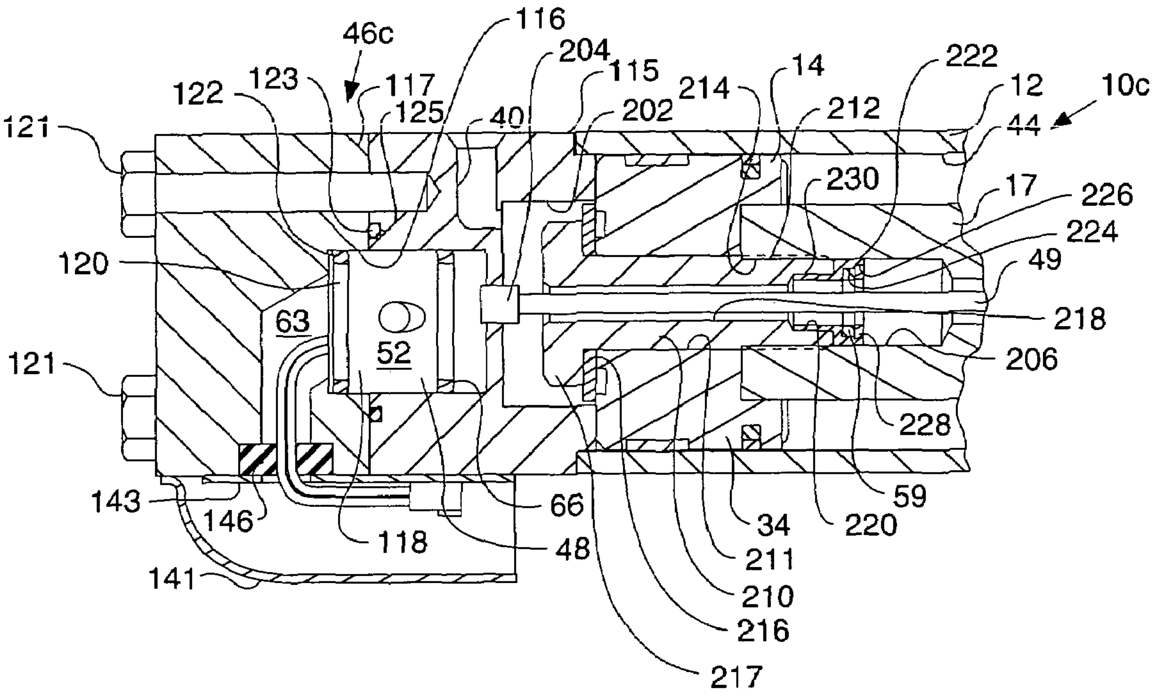
FIG. 5 is a fragmentary cross-sectional view of an eighth embodiment of a fluid actuator assembly.

As illustrated in FIG. 3A, the first housing portion 115 may include a stepped portion 202 so that a portion 204 of the sensor assembly 48 may extend into the piston chamber 44 without interfering with the piston 34. Alternatively or additionally, a portion of the piston assembly 14 may extend toward the first housing portion 115 (FIG. 5) without contacting or damaging the first housing portion 115. For example, as shown in FIG. 5, an alternative arrangement for connecting the piston 34 to the rod 17 may be provided. In such an arrangement, the rod 17 may include a counterbore 206 for receipt of a bolt 210 therein. The bolt 210 may extend through an opening 211 in the piston 34, and threads 212 on the bolt 210 may engage complimentary threads 214 within the counterbore 206 of the rod 17 so that the piston 34 is attached securely to the rod 17. A washer 216 may be provided between the head 217 of the bolt 210 and the piston 34. The bolt 210 may have an axial bore 218 therein to allow passage of the sensor 49 therethrough. The bolt 210 may further include a counterbore 220 at one end thereof for receipt of a carrier 222, which may carry the interactive element 59. The carrier 222 may include a first bore 224 for receipt of the interactive element 59 therein. The carrier may further include a second bore 226 for receipt of a retainer ring 228 therein, which may be press-fit or otherwise held within the second bore 226 in order to retain the interactive element 59 within the first bore 224. As indicated in FIG. 5, the carrier 222 may be protected within the counterbore 206 of the rod 17. Moreover, the carrier 222 may be secured within the counterbore 220 of the bolt 210 by, for example, a threaded engagement 230 with the bolt 210.

Figure 3B:
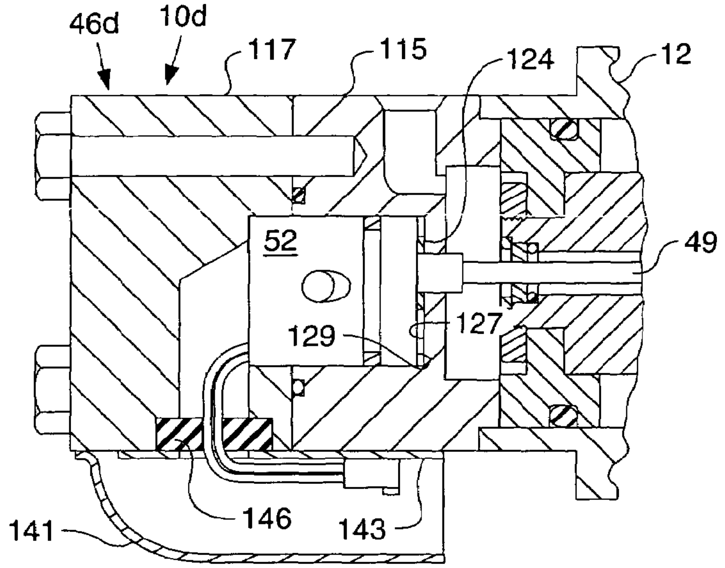
FIG. 3B is a fragmentary cross-sectional view of a fourth embodiment of a fluid actuator assembly.

Referring to FIG. 3B, a fourth embodiment of an actuator assembly 10*d* differs from actuator 10*c* shown in FIG. 3A, inter alia, by including a compression member or ring 124 such as a compressible metallic gasket, for example. The compression ring 124 is positioned between an end wall 127 within the first housing portion 115 and an end face 129 of the sensor body 52. The addition of the compression ring allows variance in machining and assembly tolerance stack-up as well as avoiding significant and undesirable compression loads on the sensor body 52 due to the sensor 48 being bolted between the halves of the housing.

Figure 3C:
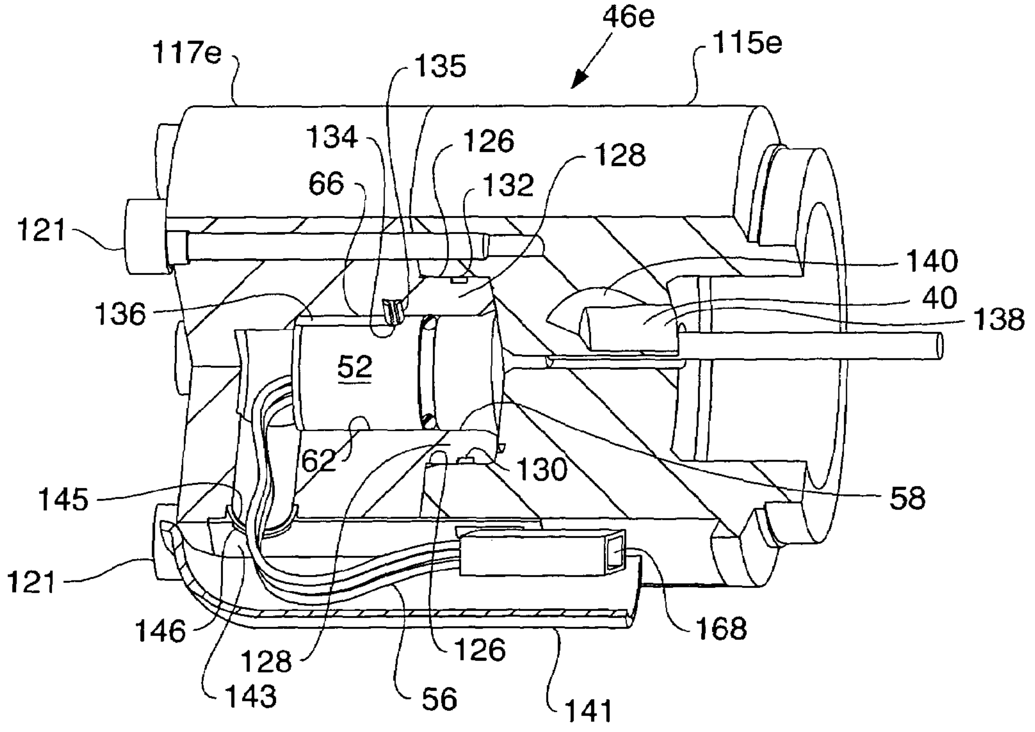
FIG. 3C is a perspective view of a housing assembly including a position sensor assembly therein of a fifth embodiment of a fluid actuator assembly, showing the housing assembly partially sectioned.

Referring to FIG. 3C, a housing assembly 46*e* for a fifth embodiment of an actuator assembly is shown. The housing assembly 46*e* differs from the housing assembly 46*c* (shown in FIG. 3A) by, inter alia, the sensor body 52 being substantially, entirely enclosed within the second housing portion 1117*e*. In so doing, during maintenance of the actuator, for example, the second housing portion 117*e* may be removed with the sensor assembly 48 and reworked on the bench rather than at the job site, while the remainder of the actuator assembly may remain on the machine or linkage to which it is attached. The first housing portion 115*e* includes a stepped portion 126 which is adapted to receive a guide portion 128 of the second housing portion 117*e*. An O-ring groove 130 is provided in the guide portion 128 and an O-ring 132 is disposed within the groove 130 such that a sealed engagement is formed between the housing portions 115*e* and 117*e*. It may be seen that a roll pin 134 is engaged within a hole 135 provided in the second housing portion 117*e*. An axially disposed slot 136 is provided within the surface 66 of the sensor body 52 to be engaged with the roll pin 134 to align the sensor body 52 within the housing assembly 46*e*. In an exemplary embodiment the port 40 may be machined to include an axial bore 138 intersecting with a radial bore 140. In placing the port in front of the sensor body 52, the sensor body may no longer require an offset between the centerline axis relative to the axial reference axis. However, if overall axial length of the actuator is limited, the offset sensor body in combination with an overlaying port configuration may be necessary. A wire guard 141 may be externally attached to the housing assembly 46*e* to protect the wires from pullout and potentially disruptive external influences. In addition, a mounting plate 143 may be mounted between the wire guard 141 and the housing assembly 46*e* to provide support for a connector 168, which may be mounted to the mounting plate 143. The mounting plate 143 may also have an aperture 145 therein for passage of wires 56 therethrough. A grommet 146 may be provided within the aperture 145 to secure the wires within the aperture 145.

Figure 3D:
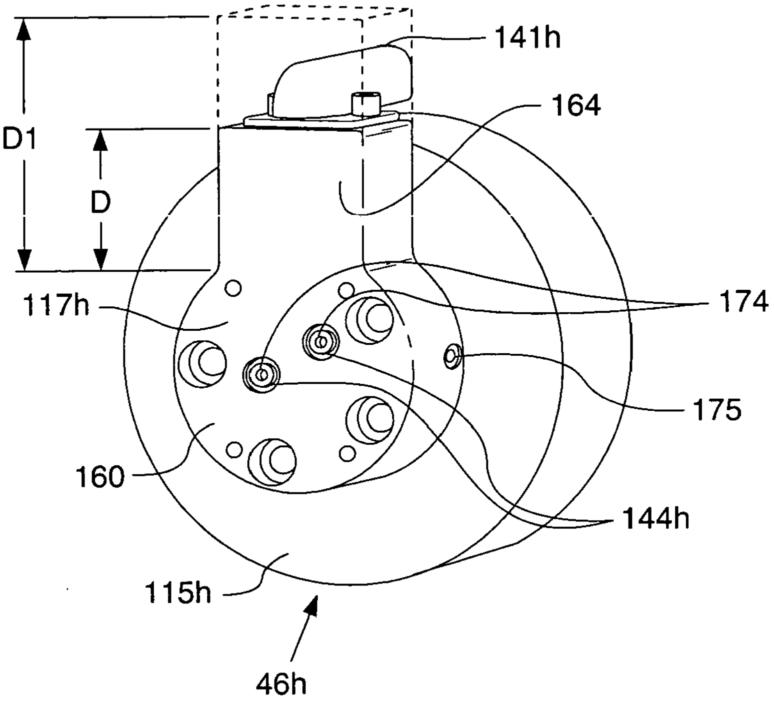
FIG. 3D is a perspective view of a housing assembly of an alternative embodiment of a fluid actuator assembly.
Figure 3E:
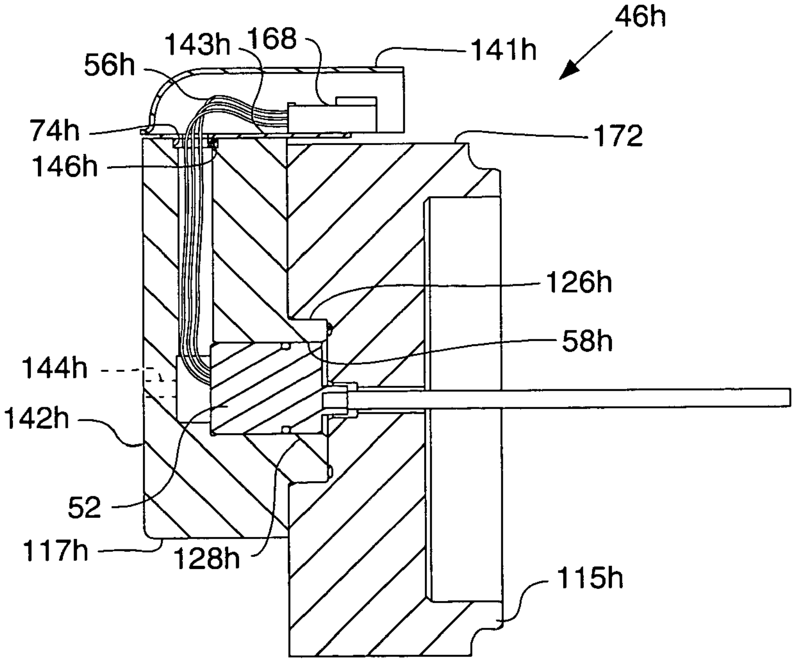
FIG. 3E is a fragmentary cross-sectional view of the housing assembly of the fluid actuator assembly of FIG. 3D.

Referring to FIGS. 3D and 3E, an alternative embodiment of a housing assembly 46*h* for an actuator assembly is shown. The housing assembly 46*h* includes a first housing portion 115*h*, which may be substantially similar in design and configuration to the first housing portion 115*e* shown in FIG. 3C. The housing assembly 46*h* further includes a universal second housing portion 117*h* that may be easily modified for application to housing assemblies and actuator assemblies having different dimensions. The universal housing portion 117*h* may include a base portion 160, which may include a guide portion 128*h* extending therefrom for insertion into a stepped portion 126*h* of the first housing portion 115*h*. It should be appreciated that the base portion 160 and/or an extension or neck portion 164 extending therefrom may be configured to have a smaller diameter (or other circumferential or cross-sectional dimension) than the first housing portion 115*h* so that the universal housing portion 117*h* is formed with less material than if it had the same diameter as the first housing portion 115*h*. Therefore, the universal housing portion 117*h* may be smaller and may be formed with less material than the second housing portion 117*e* shown in FIG. 3C. It should be appreciated that the base portion 160 may have a slightly larger diameter (or other circumferential dimension) than the guide portion 128*h*.

The universal housing portion 117*h* may include an extension or neck portion 164, which may extend, for example in a radial direction, from the base portion a desired distance D (FIG. 3D). It should be appreciated that the neck portion 164 may be originally configured to extend a distance longer than the distance D and may be machined down to a desired distance D during manufacturing or assembly, for example so that the neck portion 164 extends just slightly beyond an outer portion or edge 172 of the first housing portion and/or an outer portion or edge (not shown) of the actuator assembly. Thus, a single universal housing portion 117*h* may be easily modified to be used with housing assemblies and actuator assemblies having different dimensions. In the embodiment shown in FIGS. 3D and 3E, for example, the neck portion 164 may have been machined down to a distance D from an original distance D1 that was longer than distance D. By machining the neck portion 164 down to a desired distance D, a guard member 141*h*, a connector 168, and/or wires 56*h* associated with a sensor body 52 may be mounted atop the neck portion 164 such that the guard member 141*h*, connector 168, and/or wires 56*h* may (i) clear an outer portion or edge 172 (such as a welded area, for example) of the first housing portion 115*h* and/or an outer portion or edge of the actuator assembly (not shown), and (ii) not extend significantly beyond the edge 172. Thus, a single universal housing portion 117*h* originally configured with a neck portion 164 having an original distance D1 may be easily modified (e.g., shortened) to be applied to housing assemblies and/or actuator assemblies having different diameters or dimensions. For example, if the diameter of a first housing portion was longer or shorter than the first housing portion 115*h* shown in FIGS. 3D and 3E, the universal housing portion 117*h* may be left longer or machined to a shorter distance D, respectively, as desired. Such a universally applicable, easily modifiable housing portion 117*h* may provide a cost savings by (i) reducing the amount of material required for a housing portion 117, and (ii) reducing the number of different housing portions 117 used over a full product line of housing assemblies and/or actuator assemblies having different diameters and dimensions.

In addition or alternative to one or more access openings 74*h* communicating with a pilot opening 58*h* and terminating atop the universal housing portion 117*h*, one or more axial passages 144*h* may communicate with the pilot opening 58*h* and may terminate at an end 142*h* of the universal housing portion 117*h*. During disassembly of the actuator assembly shown in FIGS. 3*d* and 3*e*, the universal housing portion 117*h* may be separated from the first housing portion 115*h*, and a rod member (not shown) may be inserted through one or more of the axial passages 144*h* (toward the direction of the first housing portion 115*h* as illustrated in FIG. 3*e*) to push the sensor body 52 out of the pilot opening 58*h* of the universal housing portion 117*h*. It should be appreciated that each axial passage 144*h* (or access opening 74*h*) may be sealed with a plug 174 if the axial passage (or access opening) is not being used. A set screw arrangement 175 may also be provided within the housing portion 117*h* for ensuring that the sensor body 52 is held firmly in place within the pilot opening 58*h*.

Figure 4A:
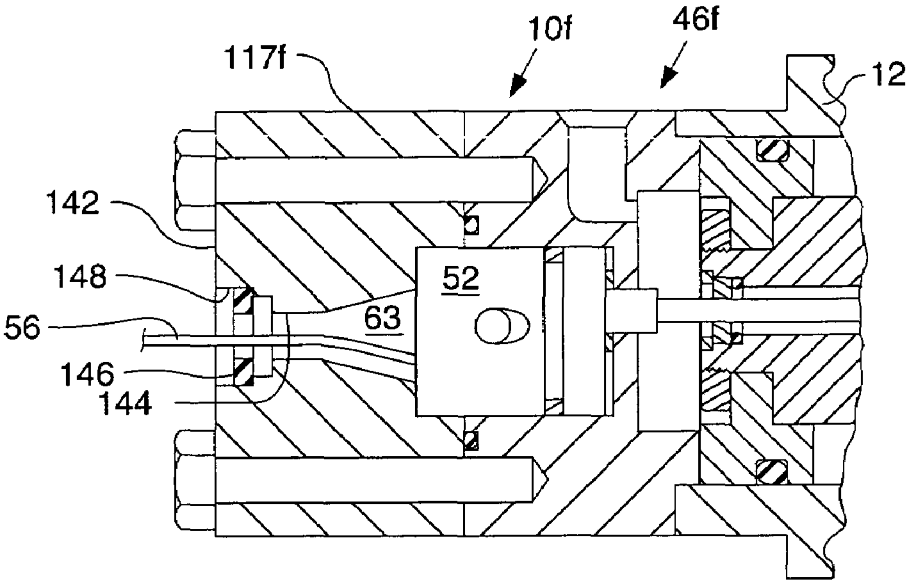
FIG. 4A is a fragmentary cross-sectional view of a sixth embodiment of a fluid actuator assembly.

Referring to FIG. 4A, a sixth embodiment of an actuator assembly 10*f* is shown and differs from the actuator assembly 10*d* (FIG. 3B) by, inter alia, including a modified second housing portion 117*f*. The second housing portion 117*f* includes an end 142 having an axial access passage 144 therethrough to allow the wires 56 to exit the housing assembly 46*f*. A grommet 146 is engaged within a bore 148 to seal the wires 56 relative the second housing portion 117*f*. In so doing, the dead space 63 is protected from the environment (moisture, dust, etc.).

Figure 4B:
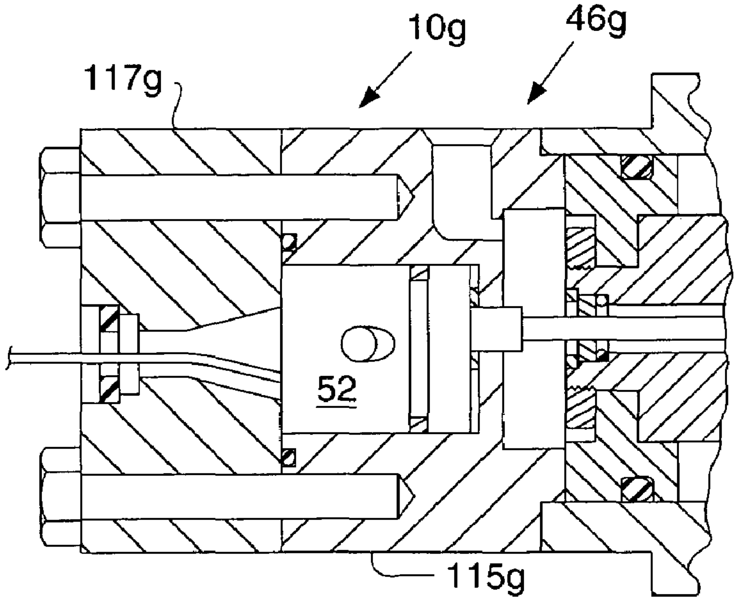
FIG. 4B is a fragmentary cross-sectional view of a seventh embodiment of a fluid actuator assembly.

Referring to FIG. 4B, a seventh embodiment of an actuator assembly 10*g* is shown and differs from the actuator assembly 10*f* (FIG. 4A) by, inter alia, including modified first and second housing portions 115*g*, 117*g* which provide for substantially enclosing the sensor body 52 within the first housing portion 117*g*.

INDUSTRIAL APPLICABILITY

In operation, the exemplary actuator assemblies, each including a piston assembly slideably disposed in a body and a piston position sensor assembly being encased within and removably receivable within the actuator cylinder, provide for moving the piston assembly along an axial reference within the body when pressurized fluid is introduced into at least one of the ports 40, 42. The actuator assemblies further provide for sensing a piston/rod position within a sensor portion of the piston position sensor assembly through communication between (i) a sensor of the piston position sensor assembly telescopically received by the piston assembly and/or the rod assembly and (ii) the interactive element attached to the piston assembly; transmitting the sensed piston position to an encased sensor electronics module which is piloted along the reference axis within a housing; and providing substantially no leakage of working fluid between a piston chamber and an area external thereto through a sealed engagement between the housing assembly and the body.

By encasing the sensor body, which includes the sensor electronics module therein, within a pilot opening aligned with the piston chamber, maintainability and serviceability are significantly improved over known actuators. Additionally, since ease of access and removal of the sensor assembly is significantly improved, then costs associated with system downtime and extensive maintenance may be avoided.

Moreover, the actuator assemblies of the present invention are adapted for use with a wide variety of sensors of different sizes, shapes and types in addition to the magnetostrictive sensors shown and discussed hereinabove used for determining piston and rod assembly position relative to the body 12, as well as for other purposes. The sensors disposed or embedded in the sensor port or passage of the cylinder, as well as the sensor electronics module, can have a wide variety of different shapes and sizes, and can be securely mounted in the sensor port or passage using, for instance, frictional engagement, adhesives, and/or conventional mechanical fasteners and the like. Similarly, the present invention is contemplated for use with a wide variety of fluid cylinder constructions in addition to those disclosed and illustrated herein, including cylinders having a wide variety of different port configurations and locations, as well as different means for attachment to a linkage system.

Other aspects, objects and advantages of the present invention can be obtained from a study of the drawings, the disclosure, and the appended claims.

What is claimed is:

1. An actuator arrangement comprising:

a body;

at least one of a piston assembly and a rod assembly, the assembly being slideably disposed in the body;

a sensor arrangement comprising: a sensor, a sensor electronics module positioned in a sensor body, and an interactive element, the interactive element being moveable relative the sensor wherein a position of the interactive element indicative of a position of the at least one of a piston assembly and a rod assembly is communicated to the sensor electronics module through the sensor; and a housing assembly attached to an end of the body and including a sensor pilot portion, the sensor pilot portion in the housing assembly being structured and arranged to sealably receive the sensor electronics module therein, wherein the sensor electronics module is encased within the sensor body and having a seal being disposed between the sensor body and the sensor pilot portion of the housing.

2. The actuator arrangement of claim 1, wherein the housing assembly is removably attached to an end of the body.

3. The actuator arrangement of claim 1, wherein the at least one of a piston assembly and a rod assembly includes a rod attached thereto, and the sensor is telescopically received within the rod.

4. The actuator arrangement of claim 1, wherein a seal arrangement include a backup ring positioned between housing assembly and the body portion.

5. The actuator arrangement of claim 1, wherein the sensor pilot portion of the housing assembly defines an opening sized to permit the sensor electronics module to be sealably and removably inserted therein.

6. The actuator arrangement of claim 1, wherein:

the housing assembly includes a housing portion with a first end and a second end, the first end engaging the end of the body; and the housing assembly further includes a cover disposed in sealed abutment with the second end of the housing portion.

7. The actuator arrangement of claim 1, wherein the housing is integrally attached to the body.

8. The actuator arrangement of claim 1, wherein:

the housing includes a first housing portion and a second housing portion, the first housing portion being connected to an end of the body;

the second housing portion is attached to an end of the first housing portion; and the second housing portion has a smaller outer diameter than the first housing portion.

9. The actuator arrangement of claim 1, wherein:

the housing includes a first housing portion and a second housing portion, the first housing portion being connected to an end of the body;

the sensor pilot portion is formed at least in part by the second housing portion;

the second housing portion includes a base portion having an outer diameter that is smaller than the outer diameter of the first housing portion;

the second housing portion includes an extension portion extending from the base portion; and the extension portion extends radially outward beyond a radially outer portion of the first housing portion.

10. The actuator arrangement of claim 9, wherein the extension portion includes a mounting area disposed at a radially outer end thereof.

11. The actuator arrangement of claim 1, further comprising a seal assembly disposed between the sensor electronics module and the pilot portion of the housing assembly.

12. The actuator arrangement of claim 1, further comprising a spacer element provided within the pilot portion, the spacer element being configured and arranged to prevent or inhibit movement of the sensor electronics module in an axial direction within the housing assembly.

13. The actuator arrangement of claim 1, further comprising a compressible compression member disposed axially between the housing assembly and the sensor electronics module.

14. The actuator arrangement of claim 1, wherein:

the housing assembly includes first and second housing portions;

the second housing portion includes a guide portion extending axially therefrom; and the first housing portion includes a stepped portion configured and arranged to receive the guide portion therein.

15. The actuator arrangement of claim 1, wherein:

the at least one of a piston assembly and a rod assembly is slideably disposed within a piston chamber having fluid therein; and the seal assembly is configured and arranged to allow substantially no leakage of fluid from the piston chamber through the pilot portion.

16. The actuator arrangement of claim 1, wherein:

the sensor electronics module is encased within a sensor body, and the sensor body is encased within the housing;

the at least one of a piston assembly and a rod assembly is slideable along an axial reference within the body of the actuator arrangement; and the sensor body is piloted by the pilot portion along the axial reference.

17. The actuator arrangement of claim 16, wherein the sensor body is piloted in axial alignment with the axial reference.

18. The actuator arrangement of claim 16, wherein the sensor body is piloted in an offset position with respect to the axial reference.

19. A trunnion mounted cylinder arrangement comprising:

a body;

at least one of a piston assembly and a rod assembly, the assembly being slideably disposed in the body;

a sensor arrangement comprising: a sensor, a sensor electronics module positioned in a sensor body, and an interactive element, the interactive element being moveable relative the sensor, wherein a position of the interactive element indicative of a position of the at least one of a piston assembly and a rod assembly is communicated to the sensor electronics module through the sensor; and a housing attached to an end of the body and including a sensor pilot portion, the sensor pilot portion in the housing being structured and arranged to sealably receive the sensor electronics module therein, wherein the sensor electronics module is encased within the sensor body and having a seal being disposed between the sensor body and the sensor pilot portion of the housing.

20. A method of operating a fluid cylinder including at least one of a piston assembly and a rod assembly, the assembly being slideably disposed in a body, and a position sensor assembly adapted to be encased within and removably receivable within the fluid cylinder, the method comprising:

moving the at least one of a piston assembly and a rod assembly along an axial reference within the body;

sensing a position of the at least one of a piston assembly and a rod assembly within a sensor portion of the position sensor assembly through communication between the sensor portion and an interactive element connected to the at least one of a piston assembly and a rod assembly;

telescopically receiving the sensor portion within a rod connected to the at least one of a piston assembly and a rod assembly;

transmitting the sensed position to an encased sensor electronics module positioned in a sensor body which is piloted along the reference axis and within a pilot portion of a housing assembly attached to the body; and allowing substantially no leakage of working fluid between a piston chamber and an area external thereto through a sealed engagement between the sensor pilot portion of the housing assembly and the sensor body of the sensor assembly by a seal disposed therebetween.

21. The method of claim 20, wherein the step of transmitting the sensed position includes transmitting the sensed position to an encased sensor electronics module which is piloted in axial alignment with the reference axis.

22. The method of claim 20, wherein the step of transmitting the sensed position includes transmitting the sensed position to an encased sensor electronics module which is piloted in an offset position with respect to the reference axis.

23. The method of claim 20, wherein the step of allowing substantially no leakage of working fluid includes allowing substantially no leakage of working fluid between the piston chamber and an area external thereto through a sealed engagement between the housing assembly and the position sensor assembly.

* * * * *